(12) United States Patent
Elmer

(10) Patent No.: US 10,695,690 B2
(45) Date of Patent: Jun. 30, 2020

(54) DISTILLATION COLUMNS COMPRISING A ROTATING POLYGONAL (SQUARE) COMPONENT

(71) Applicant: Edward Elmer, Hertfordshire (GB)

(72) Inventor: Edward Elmer, Hertfordshire (GB)

( * ) Notice: Subject to any disclaimer, the term of this patent is extended or adjusted under 35 U.S.C. 154(b) by 0 days.

(21) Appl. No.: 16/325,890

(22) PCT Filed: Jun. 13, 2017

(86) PCT No.: PCT/GB2017/051709
§ 371 (c)(1),
(2) Date: Feb. 15, 2019

(87) PCT Pub. No.: WO2018/037201
PCT Pub. Date: Mar. 1, 2018

(65) Prior Publication Data
US 2019/0217220 A1    Jul. 18, 2019

(30) Foreign Application Priority Data
Aug. 23, 2016 (GB) .................................. 1614379.4

(51) Int. Cl.
*B01D 3/12* (2006.01)

(52) U.S. Cl.
CPC ...................... *B01D 3/12* (2013.01)

(58) Field of Classification Search
CPC .................... B01D 3/12; B01D 3/42
See application file for complete search history.

(56) References Cited

U.S. PATENT DOCUMENTS 2,220,171 A    11/1940 Noaillon
2,383,945 A    9/1945 Shantz
2,893,713 A *  7/1959 Haltmeier ............ B01D 3/20
                                             261/114.2
3,685,811 A *  8/1972 Heckmann ........... B01D 3/163
                                             261/114.1
3,708,401 A *  1/1973 Wessels ............... B01D 3/006
                                             202/173
8,910,702 B2 * 12/2014 Daly .................. B01D 5/0009
                                             165/111
2013/0233016 A1* 9/2013 Wilson ............... F25J 3/04909
                                             62/643

FOREIGN PATENT DOCUMENTS

DE    3418982 A1    11/1985
WO    2010/135252 A1    11/2010
WO    2013/120403 A1    8/2013
WO    2018/037201 A1    3/2018

OTHER PUBLICATIONS

International Written Opinion for International Application No. PCT/GB2017/015709, dated Sep. 7, 2017, 5 pages.
International Search Report for International Application No. PCT/GB2017/015709, dated Sep. 7, 2017, 5 pages.
International Written Opinion for International Application No. PCT/GB2017/015709, dated Feb. 13, 2019, 5 pages.

* cited by examiner

*Primary Examiner* — Jonathan Miller
(74) *Attorney, Agent, or Firm* — TraskBritt

(57) ABSTRACT

A distillation column comprises at least one wall enclosing a chamber and at least one feed input, at least one condensate removal point and at least one vapor take-off point; wherein the column further comprises a polygonal cross-section component that is mounted within the chamber; and wherein the polygonal component is configured to rotate within the chamber in use.

17 Claims, 2 Drawing Sheets

DISTILLATION COLUMNS COMPRISING A ROTATING POLYGONAL (SQUARE) COMPONENT

CROSS-REFERENCE TO RELATED APPLICATIONS

This application is a national phase entry under 35 U.S.C. § 371 of International Patent Application PCT/GB2017/051709, filed Jun. 13, 2017, designating the United States of America and published in English as International Patent Publication WO 2018/037201 A1 on Mar. 1, 2018, which claims the benefit under Article 8 of the Patent Cooperation Treaty to Great Britain Patent Application Serial No. 1614379.4, filed Aug. 23, 2016.

TECHNICAL FIELD

The disclosure relates to distillation or fractioning columns.

BACKGROUND

Distillation columns, otherwise known as fractioning or fractionating columns, are used widely for the separation of liquids or vapor-liquid mixtures, for example, in the refining of petroleum or recovery of solvents. Distillation of a liquid essentially works via the application and removal of heat to exploit differences in volatility or boiling points between liquids. Application of heat causes components with lower boiling points and higher volatility to be vaporized, leaving less volatile components (those with higher boiling points) as liquids.

Typically, a "feedstock" that is to be separated is fed into a distillation column at one or more points. Vaporized components exit via one or more vapor take-off points located toward the top end of the distillation column, while the remaining liquid components exit via a condensate removal point, located toward the bottom of the column.

A number of column types have been developed. Two of the most commonly used types are packed bed distillation columns and plate columns, where the column comprises either packing or plates, respectively, to provide a large surface area for vapor/liquid contact within the chamber of the column.

Differences in boiling points cause the more volatile components to transfer from the liquid phase to the vapor phase, and the packing or plates increases the surface area available for phase change to occur, hence increasing the efficiency of separation of the components.

In a packed bed or plate distillation column, the packing material ideally possesses a high surface area to volume ratio. When wetted with the condensed phase, this high surface area develops numerous sites where evaporation may occur within the column. Each site of evaporation generates a dynamic equilibrium between the condensed phase and the vapor phase. The successive generation of these phase changes enriches the vapor phase with a higher proportion of the volatile component. The less volatile condensed phase is slowly removed from these equilibrium sites by gravity.

Taller distillation columns achieve more phase changes with coincident gravitational removal of the less volatile component, to improve separation efficiency of components differing in volatility. However, to achieve this, the size of the column has to be increased. Also, more plates or layers of packing are required to achieve improved separation but at the cost of a slower process, so there must be a trade-off between speed and quality of separation. Taller distillation columns also give rise to large hold up volumes and prolonged equilibrium times. Further disadvantages also experienced with previous packed bed columns include a low separation efficiency for high liquid flow rates and low cost efficiency with low liquid flow rate. Prior packed bed distillation columns also suffer from the possibility of breakage of the packing, both plates and packing material during distillation due to thermal expansion of the packing. In prior plate columns, high pressure drops produced by high throughput can cause flooding and foaming to occur where vapor flows up through liquid.

It is an object of the current disclosure to alleviate at least these known issues.

BRIEF SUMMARY

In a first broad independent aspect, the disclosure provides a distillation column comprising at least one wall enclosing a chamber and at least one feed input, at least one condensate removal point and at least one vapor take-off point; wherein the column further comprises a polygonal cross-section component that is mounted within the chamber; and wherein the polygonal component is configured to rotate within the chamber in use.

Providing a distillation column with these features is advantageous because the rotating polygonal cross-section component generates radial changes in clearance with the wall of the distillation column to achieve separation efficiency.

Rotating, or spinning, of the component achieves rapid velocity fluctuations of the vapor adjacent to the column wall. The rapid velocity fluctuations induce rapid evaporation and condensation phase changes at the column wall by virtue of pressure variations, hence equilibration time is reduced. The rotation of the component also removes the condensate by centrifugation, resulting in the preferential removal of the lower volatility component to the column wall and subsequent drainage under gravity. Improved enrichment of the more volatile component in the vapor phase will thus be achieved.

This configuration is also particularly advantageous because it provides low volumetric hold up compared to prior apparatus and systems, and provides a low height equivalent to a theoretical plate (HETP). The apparatus is also suited to continuous flow through refining and generates high plate numbers at high volumetric flow throughput.

In a subsidiary aspect, the polygonal cross-section component, in use, rotates about a central axis of the distillation column. Rotating the polygonal cross-section component about the central axis of the distillation column further improves the evaporation and condensation phase changes at the column wall, particularly because these changes can occur around the entire circumference of the wall.

In a subsidiary aspect, the polygonal cross-section component rotates about an axis that passes through the component. This configuration is particularly advantageous because the evaporation and condensation phase changes at the column wall are improved while the configuration of the distillation column is simplified.

In a subsidiary aspect, the polygonal cross-section component rotates about a central axis of the component. Rotating the polygonal cross-section component about a central axis of the component further improves the evaporation and condensation phase changes at the column wall. This configuration is particularly advantageous compared to apparatuses or systems that comprise a component that rotates about a central axis of a column but not about a central axis of the component, because this configuration simplifies the generation of evaporation and condensation phase changes at the column wall.

In a subsidiary aspect, the polygonal cross-section component comprises a side surface that faces an inside surface of the column wall. Providing a distillation column wherein a side surface of the polygonal cross-section component faces an inside surface of the column wall further improves the evaporation and condensation phase changes at the column wall.

In a subsidiary aspect, at least one extremity of the polygonal cross-section component is contiguous with the wall of the distillation column. This configuration is particularly advantageous because rotational changes in clearance with the distillation column wall achieve greater velocity fluctuations of the vapor adjacent to the column wall. Greater velocity fluctuation improves the rapidity of phase change at the column wall and improves removal of condensate to the column wall by centrifugation.

In a subsidiary aspect, the chamber of the distillation column has a polygonal cross-section. A column with a polygonal cross-section further enhances the pressure fluctuations occurring at the wall of the column. This configuration also improves the removal of the condensed phase under gravity during operation of the distillation column.

In a subsidiary aspect, the column wall has a polygonal cross-section. Providing a polygonal column wall improves the rapid evaporation and condensation phase changes at the column wall by reducing the induced rotational velocity of the vapor. This induced rotational velocity becomes a significant limitation to the rapidity of phase changes in larger diameter columns. The induced rotational vapor velocity in smaller columns is reduced by the viscosity of the vapor phase.

In a subsidiary aspect, the chamber of the distillation column is at least substantially cylindrical and the polygonal cross-section component has a square cross-section. This configuration provides the advantage of enhancing evaporation and condensation phase changes at the points where extremities of the square cross-section component are contiguous with and rotate relative to the cylindrical chamber.

In a subsidiary aspect, the column comprises a plurality of polygonal cross-section components. Providing a plurality of polygonal cross-section components creates additional points at which phase changes between evaporation and condensation occurs. Additional components also increase the centrifugation of condensate to the column wall. A more rapid distillation process may be achieved.

In a subsidiary aspect, at least two of the plurality of polygonal cross-section components are arranged one above the other. This configuration provides the advantage of optimizing the centrifugation of condensate to the column wall because condensate is less likely to be transferred from one polygonal component to another within the chamber.

In a subsidiary aspect, an angle of contact of the feedstock with the column wall and the rotatable polygonal cross-section component is less than 90 degrees. This configuration optimizes the wettability of the column wall and the rotatable polygonal cross-section component to effect separation efficiency.

In a subsidiary aspect, each feed input of the distillation column is located to optimize separation efficiency of the particular feedstock within the chamber. Separation efficiency is optimized because evaporation and condensation phase changes are maximized due to the positioning of each feed input.

In a subsidiary aspect, further comprising a plurality of optionally workable feed inputs and, at least one of the feed inputs is actuated to optimize the separation efficiency of a particular feedstock composition. Fitting the distillation column with feed input points at differing positions, particularly different heights, enables separation efficiency to be maximized for varying feedstock compositions.

In a subsidiary aspect, each polygonal cross-section component is comprised of a material suitable to withstand centrifugal forces associated with rotating the (or each) component within the chamber. This configuration improves the lifespan of the distillation column as well as improving separation efficiency in use.

In a subsidiary aspect, the column further comprises means for applying an external pressure pulse to the distillation column. More preferably, the means for providing an external pressure pulse is connected to a top end of the distillation column. The pressure waves propagating down the column induce evaporation and condensation phase changes, which may be capitalized on by centrifugation of the column contents to preferentially remove the least volatile component. The pressure pulses may be typically achieved by a vibrating diaphragm or an oscillating piston arrangement.

In a subsidiary aspect, the column further comprises a rotating spindle equipped with vertically orientated paddles. This configuration removes the need for polygonal rotating components. This configuration also allows unhindered propagation of the pressure pulse while still inducing phase separation by centrifugation.

In a subsidiary aspect, the column further comprises a further spindle, equipped with a plurality of horizontal plates, and a drive that, in use, vibrates the further spindle in the vertical plain while spinning the spindles. This arrangement achieves pressure pulsation adjacent to the horizontal plate surface, with subsequent condensation and evaporation phase changes, and the centrifugation of the condensed phase.

In a second broad aspect, the invention provides a method of distillation, comprising the steps of: introducing a liquid or liquid-vapor mixture into a distillation column comprising a polygonal cross-section component; rotating the polygonal cross-section component to induce rapid evaporation and condensation phase changes; and removing at least part of a condensate and a vapor from the distillation column.

Rotating, or spinning, of the polygonal cross-section component achieves rapid velocity fluctuations of the vapor adjacent to the wall of the distillation column. The rapid velocity fluctuations induce rapid evaporation and condensation phase changes at the column wall, so equilibration time is reduced. The rotation of the polygonal cross-section component also removes the condensate by centrifugation, resulting in the preferential removal of the lower volatility component to the column wall and subsequent drainage under gravity. Improved enrichment of the more volatile component in the vapor phase will also be achieved.

DETAILED DESCRIPTION

Figure 1:
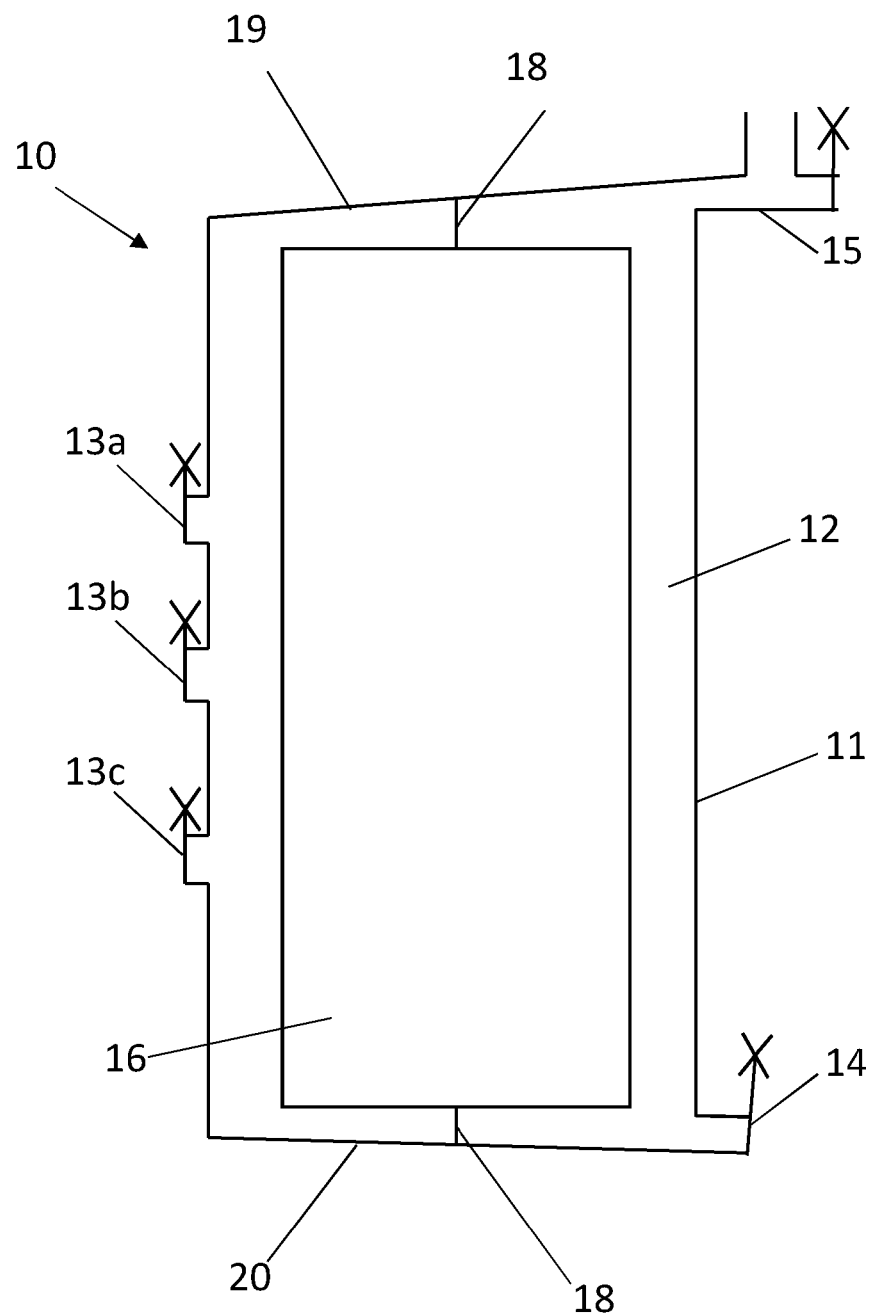
FIG. 1 shows a cross-sectional view from the side of a distillation column of one embodiment.

FIG. 1 illustrates a preferred embodiment of a distillation column, generally referenced as ID, for the distillation, i.e., separation and purification, of liquid or liquid-vapor mixtures.

Figure 2:
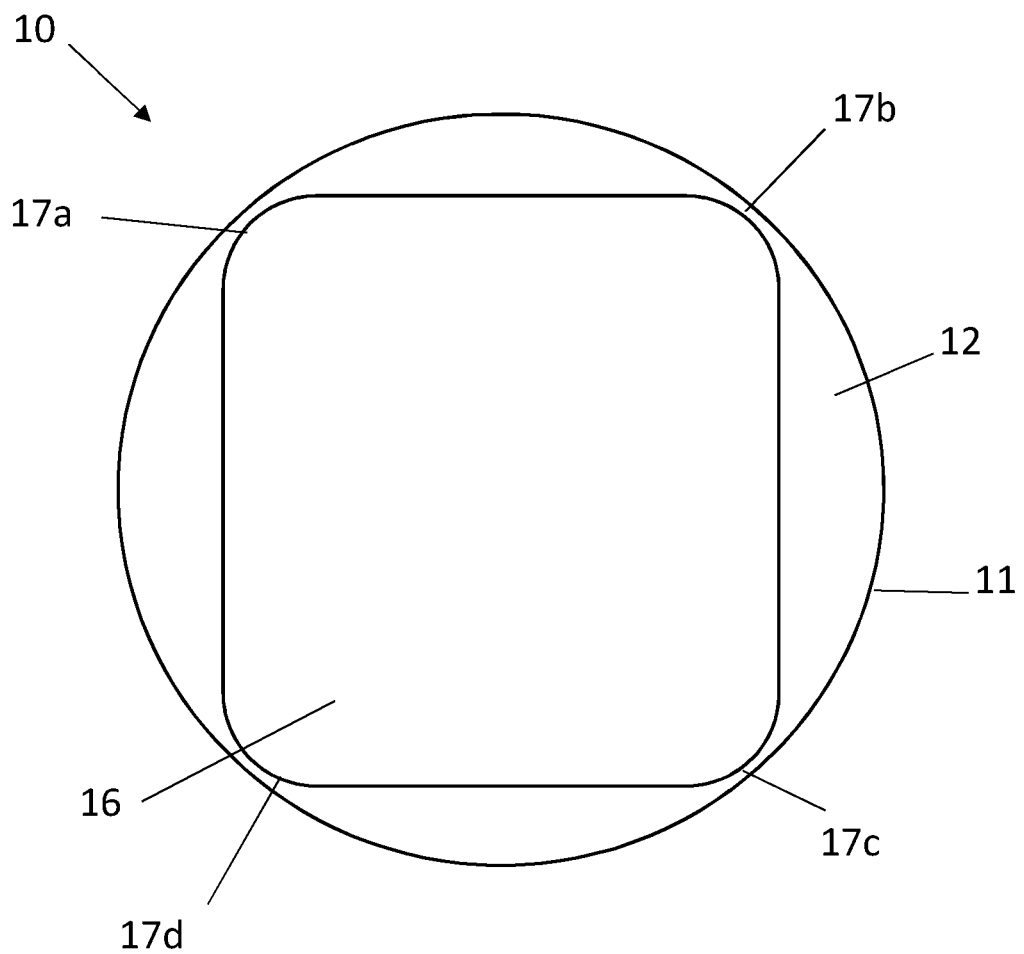
FIG. 2 shows a cross-sectional view from above of a distillation column of one embodiment.

In the embodiment of FIGS. 1 and 2, the distillation column 10 comprises a single side wall 11 enclosing a chamber 12 and the column has a cylindrical or circular cross-section. In alternative embodiments, more than one wall may be provided. The distillation column 10 further comprises a roof 19, floor 20, a number of feed input points 13a-13c, at least one condensate removal point 14 and at least one vapor take-off point 15. One or more feed inputs 13, located at varying positions on the distillation column 10, serve to introduce a feedstock into the distillation column 10 for separation.

The distillation column 10 further comprises a polygonal cross-section component 16, which is mounted within the chamber of the distillation column 10. In a preferred embodiment, the component 16 is a polyhedron, shown having a square cross-section. However, in alternative embodiments, the component 16 may be a polyhedron having any other polygonal cross-section configured for maximum separation efficiency. FIG. 1 shows a preferred embodiment wherein the component 16 has a square/rectangular cross-section and the side wall 11 of the distillation column 10 forms a substantially cylindrical chamber 12. The polygonal cross-section component 16 is configured to rotate within the chamber 12 of the distillation column 10 to generate radial changes in clearance with the column side wall 11, which improves separation efficiency compared to standard plate or packed bed distillation columns.

Rotation of the polygonal cross-section component 16 within the chamber 12 of the distillation column 10 achieves rapid velocity fluctuations of vapor adjacent to the column side wall 11. These fluctuations induce rapid evaporation and condensation phase changes at the column side wall 11. Equilibration time is thereby minimized. Rotation of the polygonal cross-section component 16 causes the distillation column 10 to additionally act as a centrifuge, forcing condensate to the side wall 11. More efficient drainage of the lower volatility component (the condensate) is achieved because it is forced out and down (via gravity) more rapidly. Improved enrichment of the more volatile component within the distillation column 10 will also be achieved.

Rotation of the polygonal cross-section component 16 within the chamber 12 also minimizes volumetric holdup within the distillation column 10, i.e., liquid travelling down the distillation column 10 does not become trapped in packing but flows efficiently down the side wall 11 of the distillation column 10. The configuration of the distillation column 10 with the polygonal cross-section component 16 also minimizes the height equivalent to a theoretical plate (HETP) to maximize separation efficiency within the column 10.

In a preferred embodiment, the polygonal cross-section component 16 spins, in use, about the central axis of the distillation column 10. Preferably, the axis of rotation passes through the body of the polygonal cross-section component 16 itself. Even more preferably, the polygonal cross-section component 16 rotates about a central axis of the component 16. In other words, the polygonal cross-section component 16 is located centrally within the column 10 and rotates/spins about the center of the component 16 rather than about a central axis of the column 10 which is not the center of the component 16, e.g., about a central shaft of the column 10.

In an alternative embodiment, the polygonal cross-section component 16 is mounted to and rotates about the central axis of the column, but is not centrally symmetric about the central axis of the column. For example, the polygonal cross-section component 16 may be a wedge-shaped component, wherein the thin end of the "wedge" is located toward the center of the column 10, and the thick end of the "wedge" is proximal to the inner surface of the column wall.

In a preferred embodiment, the polygonal cross-section component 16 comprises a side surface that faces the inside surface of the column side wall 11.

As shown in both figures, the polygonal cross-section component 16 is preferably located centrally within the chamber 12 of the distillation column 10. The extremities, i.e., the corners of the polygonal cross-section component 16, are therefore contiguous, i.e., proximal, with the side wall 11 of the distillation column 10 as the component 16 rotates in use to optimize evaporation and condensation phase changes at the column side wall 11. Referring to FIG. 2, the polygonal cross-section component 16 has multiple extremities that are contiguous with the side wall 11 of the distillation column 10. In this embodiment, the four edges 17a-17d of the square cross-section component 16, i.e., the edges between each side of the component 16 running between each top and bottom corner, are contiguous with the side wall 11 and the four top and four bottom corners are also contiguous with the side wall 11. Preferably, in alternative embodiments, at least one extremity is contiguous with the side wall 11 to generate the fluctuations in vapor adjacent to the side wall 11 in order to induce the evaporation and condensation phase changes discussed.

As stated, in the embodiment shown in the figures, column side wall 11 is substantially cylindrical with a circular cross-section. This embodiment is most suited to the retrofitting of a polygonal cross-section component to existing distillation columns, which are typically cylindrical. In a preferred embodiment, the roof 19 of the column is sloped to facilitate take off of vapor from the distillation column 10. The floor 20 of the distillation column 10 may also be sloped to facilitate removal of condensate from the distillation column 10. In an alternative embodiment, the fluctuations occurring at the side wall 11 by inhibiting the induced rotational velocity of the vapor, which reduces the potential changes in velocity occurring at the wall.

In alternative embodiments, the distillation column 10 comprises a plurality of polygonal cross-section components that may operate separately or together. In one embodiment, at least two of the plurality of cross-section components are arranged one on top of the other.

In embodiments where a plurality of polygonal cross-section components is provided, they may rotate at the same or different speeds depending on the composition of the feedstock and the required separation efficiency. Each polygonal cross-section component may also rotate at a different time, or all components may rotate at the same time.

In a preferred embodiment, each polygonal cross-section component 16 and column side wall 11 has a high wettability, i.e., the angle of contact with the column side wall 11 and of each component 16 with a feedstock introduced into the distillation column 10 is less than 90 degrees.

In the embodiment of FIG. 1, there are three feed input points 13a-13c. Each feed input point is positioned to optimize separation efficiency. Fitting the distillation column 10 with feed input points at differing heights enables separation efficiency to be maximized for varying feedstock compositions. In a preferred embodiment, the feed input points are each separately operable and, in use, only the input points that will maximize separation efficiency for a particular feedstock composition are operated. The embodiment allows for feedstock with a greater proportion of a low volatile component to be introduced at the higher input point while conversely, feedstock with a higher proportion of a high volatile component is to be introduced at the lower input point. This arrangement maximizes separation by reducing or increasing the residence time of the components to compensate for their partial pressures. Depending on the shape of the polygonal cross-section component 16, the feed input points 13 may also be positioned at differing positions around the outer circumference of the distillation column 10 for varying feedstock compositions.

It is envisaged that the side wall 11 of the distillation column 10 is comprised of materials conventionally used in this field. Thus for small-scale units glass may have sufficient strength while larger industrial-scale units would need to be of conventional steel or stainless steel construction. The use of non-ferrous metals and plastic materials is not ruled out provided it possesses sufficient strength and compatibility with the feedstock in terms of both temperature and being inert. Glass-lined steel may be required for corrosive feedstocks. The construction materials must meet the critical criteria of an angle of contact with the feedstock; being less than 90 degrees, i.e., the construction materials must be completely wettable by the feedstock. The polygonal cross-section component 16 is preferably comprised of a material that is resistant to the centrifugal stresses expected from rotation of the component 16 within the chamber 12 of the distillation column 10. Fixings and bearings, such as 18, which mount and allow the component 16 to rotate within the chamber 12, are also comprised of a material or materials compatible with varying feedstock compositions, temperatures and the frictional stresses associated with rotation of the polygonal cross-section component 16. Metals, ceramics, plastics or a combination thereof is envisaged, although other materials known in the field may also be used. Metal provides good wettability and high strength compared to other materials such as ceramics, although ceramic has a higher wettability than metal. Plastics have sufficient strength, but they typically suffer from poor wettability.

In one embodiment, both the outer column side wall 11 and each polygonal cross-section component 16 may comprise a rough outer surface, which has a larger surface area than a smooth outer surface, for maximum contact with the feedstock introduced into the distillation column 10. The column side wall 11 and each polygonal cross-section component 16 may be treated with, for example, thermo-sprayed aluminium, a coating that maximizes the surface area and adventitiously the wettability and corrosion resistance of the components to the feedstock.

In a preferred embodiment, the polygonal cross-section component 16 is comprised of a single piece incorporating no additional packing or plates. In an alternative embodiment, the distillation column 10 further comprises a number of plates or packing that are provided above, below, and/or around the polygonal cross-section component 16 within the chamber 12 of the distillation column 10. The (or each) polygonal cross-section component 16 may also incorporate a number of openings between a cavity (not shown) within the component 16 and the chamber 12 of the distillation column 10. In this embodiment, the component 16 may comprise packing or a number of plates within the cavity of the component 16 for increasing the surface area of the component 16 to increase separation efficiency.

In one embodiment, the component 16 may have a cylindrical outer surface and a cavity with a polygonal cross-section, and the component 16 additionally comprises a number of openings between the chamber 12 of the distillation column 10 and the cavity of each component 16. In this embodiment, feedstock enters the cavity of each component 16 and contacts the polygonal cross-section wall of the cavity to induce condensate and vapor phase changes. Suitable drainage channels may also be provided inside the (or each) component 16 to ensure that condensate drains toward the bottom end of the distillation column 10 and vapor can exit toward the top end of the distillation column 10.

In an alternative embodiment, the distillation column 10 further comprises means for applying an external pressure pulse to the distillation column (not shown). The means for providing an external pressure pulse is preferably connected to a top end of the distillation column. These pressure pulses may be typically achieved by a vibrating diaphragm or an oscillating piston arrangement.

In an alternative embodiment, the distillation column 10 further comprises a rotating spindle equipped with vertically orientated paddles (not shown).

In an alternative embodiment, the distillation column 10 further comprises an additional, inner spindle, equipped with a plurality of horizontal plates, and a drive that, in use, vibrates the spindle in the vertical plain while spinning the spindles.

The invention claimed is:

1. A distillation column, comprising: at least one wall enclosing a chamber and at least one feed input, at least one condensate removal point and at least one vapor take-off point; wherein the column further comprises a polygonal cross-section component that is mounted within the chamber such that the component provides a varying radial clearance between the component and the wall of the chamber; wherein the polygonal component is configured to rotate within the chamber in use; and wherein at least one extremity of the polygonal cross-section component is contiguous with the wall of the distillation column.

2. The distillation column according to claim 1, wherein the polygonal component, in use, rotates about a central axis of the distillation column.

3. The distillation column according to claim 1, wherein the polygonal cross-section component rotates about an axis that passes through the component.

4. The distillation column according to claim 1, wherein the polygonal cross-section component rotates about a central axis of the component.

5. The distillation column according to claim 1, wherein the polygonal cross-section component comprises a side surface that faces an inside surface of the column wall.

6. The distillation column according to claim 1, wherein the chamber of the distillation column has a polygonal cross-section.

7. The distillation column according to claim 6, wherein the polygonal cross-section of the chamber corresponds to the shape of the polygonal cross-section component.

8. The distillation column according to claim 1, wherein the chamber of the distillation column is at least substantially cylindrical and the polygonal cross-section component has a square cross-section.

9. The distillation column according to claim 1, wherein the column comprises a plurality of polygonal cross-section components.

10. The distillation column according to claim 9, wherein at least two of the plurality of polygonal cross-section components are arranged co-axially.

11. The distillation column according to claim 1, wherein an angle of contact of the column wall and the polygonal cross-section component with a feedstock is less than 90 degrees.

12. The distillation column according to claim 1, wherein the at least one feed input is located to optimize separation efficiency within the chamber of the distillation column.

13. The distillation column according to claim 1, further comprising a plurality of optionally workable feed inputs and, in use, at least one of the feed inputs is actuated to optimize the separation efficiency of a particular feedstock composition.

14. The distillation column according to claim 1, wherein the polygonal cross-section component is comprised of a material suitable to withstand centrifugal forces associated with rotating the (or each) component within the chamber.

15. The distillation column according to claim 1, further comprising means for applying an external pressure pulse to the distillation column.

16. The distillation column according to claim 1, further comprising a rotating spindle equipped with vertically orientated paddles.

17. The distillation column according to claim 16, further comprising a further spindle, equipped with a plurality of horizontal plates, and a drive that, in use, vibrates the further spindle in the vertical plain while spinning the spindles.

* * * * *

UNITED STATES PATENT AND TRADEMARK OFFICE
CERTIFICATE OF CORRECTION

PATENT NO.           : 10,695,690 B2
APPLICATION NO.      : 16/325890
DATED                : June 30, 2020
INVENTOR(S)          : Edward Elmer Page 1 of 1

It is certified that error appears in the above-identified patent and that said Letters Patent is hereby corrected as shown below:

In the Specification
Column 5,    Line 7,    change "referenced as ID," to --referenced as 10,--

Signed and Sealed this
Fifteenth Day of September, 2020

Andrei Iancu
*Director of the United States Patent and Trademark Office*